US 8,306,207 B2

(12) United States Patent
Longobardi

(10) Patent No.: US 8,306,207 B2
(45) Date of Patent: Nov. 6, 2012

(54) METHOD AND APPARATUS FOR FORWARDING INCOMING TELECOMMUNICATION CALLS ACCORDING TO RECEIVER POSITION

(75) Inventor: Giuseppe Longobardi, Castellammare di Stabia (IT)

(73) Assignee: International Business Machines Corporation, Armonk, NY (US)

( * ) Notice: Subject to any disclaimer, the term of this patent is extended or adjusted under 35 U.S.C. 154(b) by 1241 days.

(21) Appl. No.: 11/532,920

(22) Filed: Sep. 19, 2006

(65) Prior Publication Data

US 2007/0154000 A1 Jul. 5, 2007

(30) Foreign Application Priority Data

Sep. 21, 2005 (EP) .................................... 05108722

(51) Int. Cl.
*H04M 3/42* (2006.01)
(52) U.S. Cl. ........... 379/211.02; 379/201.1; 379/207.12; 379/211.01
(58) Field of Classification Search ............. 379/201.06–201.09, 211.01, 201.1, 379/207.12; 455/456.1, 456.3, 456.5, 456.6, 455/457
See application file for complete search history.

(56) References Cited

U.S. PATENT DOCUMENTS

| | | | | |
|---|---|---|---|---|
| 5,414,759 A * | 5/1995 | Ishikuri et al. | ........... | 379/201.07 |
| 7,120,238 B1 * | 10/2006 | Bednarz et al. | ............ | 379/201.1 |
| 2004/0086100 A1 * | 5/2004 | Moore et al. | ............. | 379/201.01 |
| 2005/0063528 A1 * | 3/2005 | Pearson et al. | ........... | 379/211.01 |
| 2006/0077957 A1 * | 4/2006 | Reddy et al. | ................... | 370/352 |
| 2006/0093117 A1 * | 5/2006 | Agrawal et al. | .......... | 379/211.01 |
| 2006/0187046 A1 * | 8/2006 | Kramer | ..................... | 340/572.3 |

* cited by examiner

*Primary Examiner* — Fan Tsang
*Assistant Examiner* — Oleg Asanbayev
(74) *Attorney, Agent, or Firm* — Garg Law Firm, PLLC; Rakesh Garg; Libby Z. Toub

(57) ABSTRACT

A method and a corresponding apparatus for forwarding incoming calls according to the current position of the intended receiver. The position is detected by means of RFID tag and corresponding detectors. A plurality of telephone receivers are distributed within the offices of one or more sites of an entity (e.g. a private Company or Corporation or a Public Body) all connected together by means of a switchboard system. A corresponding plurality of detectors are positioned in proximity of the telephone receivers, so that the presence of an RFID tag is detected whenever it comes within a predetermined distance. Such presence of the RFID tag (and consequently the presence of the person carrying the tag to whom a telephone number is assigned) next to a target telephone receiver will then be communicated to a Central Switchboard.

18 Claims, 4 Drawing Sheets

METHOD AND APPARATUS FOR FORWARDING INCOMING TELECOMMUNICATION CALLS ACCORDING TO RECEIVER POSITION

TECHNICAL FIELD

The present invention relates to the communication field. More specifically, the present invention relates to a method of forwarding a telecommunication call within a network. The invention further relates to a computer program for performing the method, and to a product embodying the program. Moreover, the invention also relates to a corresponding apparatus.

BACKGROUND ART

In a network of telecommunication endpoints (e.g. a plurality of telephones connected through a switchboard within one or more Company sites) there is often the need of forwarding a call to a different location. As an example when a telephone number and a corresponding telephone apparatus is assigned to an employee, it is normally possible for the employee to select a forward option in order to automatically switch the call to another telephone or to an answering machine. It can happen that a telephone number assignee is away from his phone and would like an incoming call to be redirected to another phone. This can be a meeting room phone, a colleague's office phone or maybe a temporarily assigned office in a different location. If the employee knows in advance the target telephone number it is normally possible to preset his assigned telephone so that an incoming call will be redirected to such target number. Alternatively the same action can be done from the target phone. Both these solutions have some drawbacks, because an active action must be done by the receiver and, in the first case, the destination must be known in advance.

It is an object of the present invention to provide a method and a system which alleviates the above drawbacks.

SUMMARY OF THE INVENTION

According to the present invention we provide a method of managing telecommunication transactions, in a telecommunication network including a plurality of endpoints connected to at least one common server, each endpoint being assigned to at least one of a plurality of subscribers, including, for each subscriber, the steps of: associating the subscriber to a portable detectable identifier; detecting the position of said identifier; selecting one of the plurality of endpoints according to the position of said identifier; forwarding an incoming communication request addressed to the subscriber to said selected endpoint.

A further aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
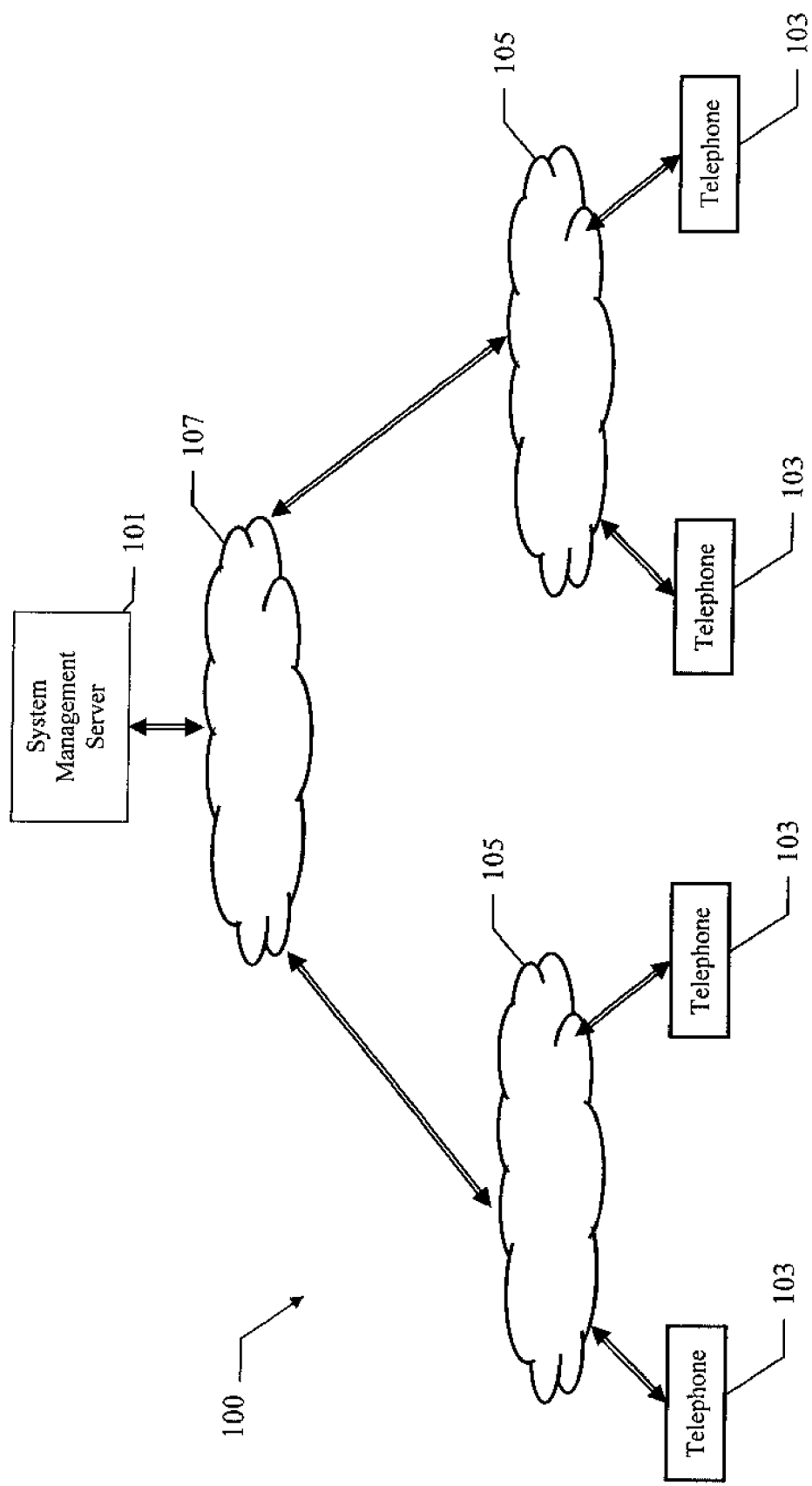
FIG. 1 is a schematic block diagram of a telephone system in which the method of the invention is applicable.

With reference in particular to FIG. 1, a local network 100 of telephones with a System Management Server 101, implementing the forwarding method of the present invention is depicted. The system 100 includes multiple endpoints 103, which are grouped into different sub network 105. The different subnetwork can be for example the local networks of different site locations of the same Company, which are all connected through a general network 107 to the centralized controlling System Management Server (containing e.g. a switchboard) 101. The endpoints 103 are normally telephone receivers connected to the centralized data processing system 101 and to one or more switchboards. FIG. 1 describes one of the many possible telephone networks which could implement the present invention; e.g. it is possible that all the telephone receivers are connected through a single network to a single switchboard, or there could be several levels of switchboards connected one each other through several sub-networks. The present example describes a telephone network, however a similar system could be implemented with other kinds of endpoints, e.g. instant messenger terminals.

Figure 2:
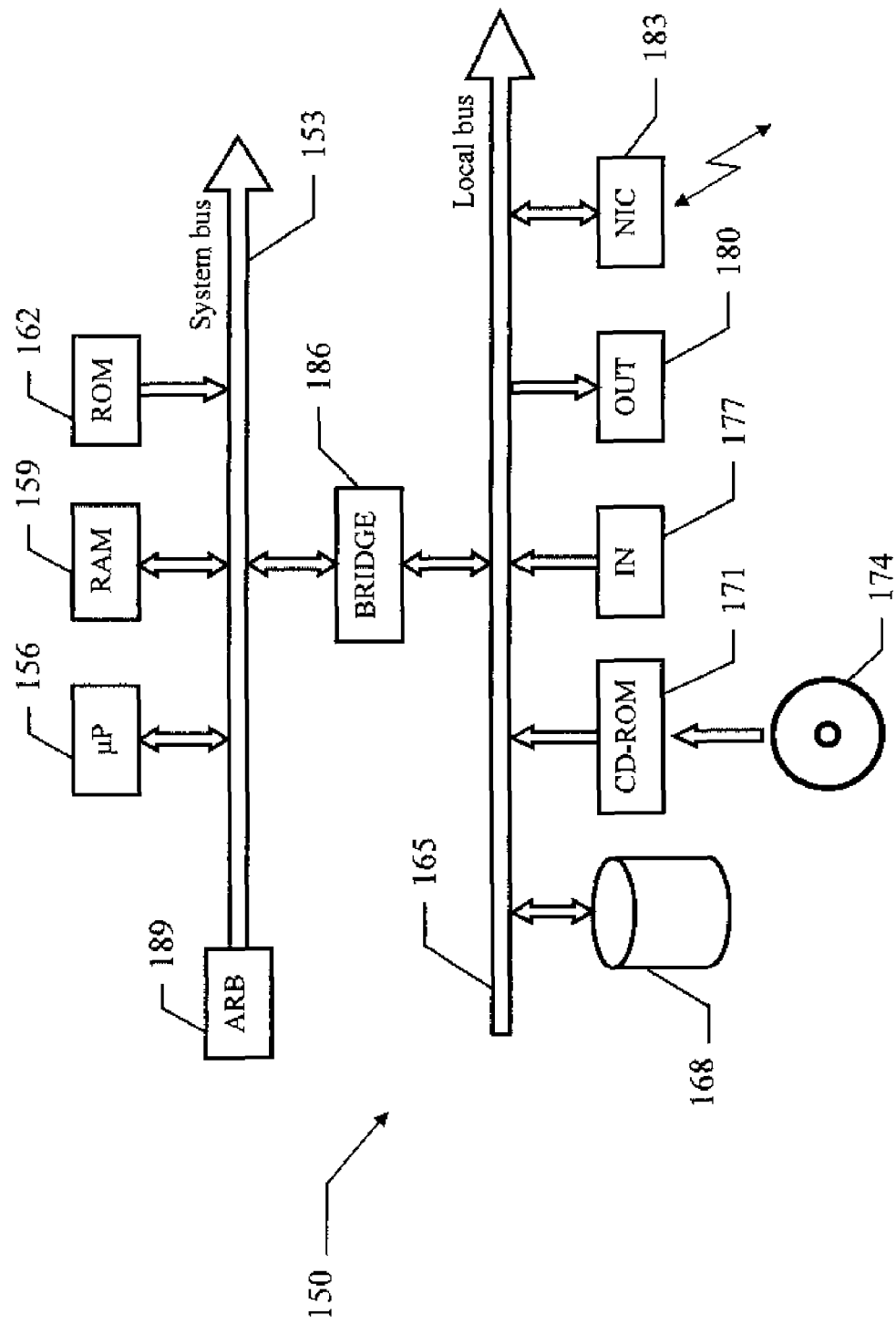
FIG. 2 shows the functional blocks of a generic computer of the system.

As shown in FIG. 2, a generic computer of the system (workstation, local server, or system management server) is denoted with 150. The computer 150 is formed by several units that are connected in parallel to a system bus 153. In detail, one or more microprocessors (.mu.P) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. The working memory and the mass memory are examples of computer usable non-transitory storage media. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized.

Figure 3:
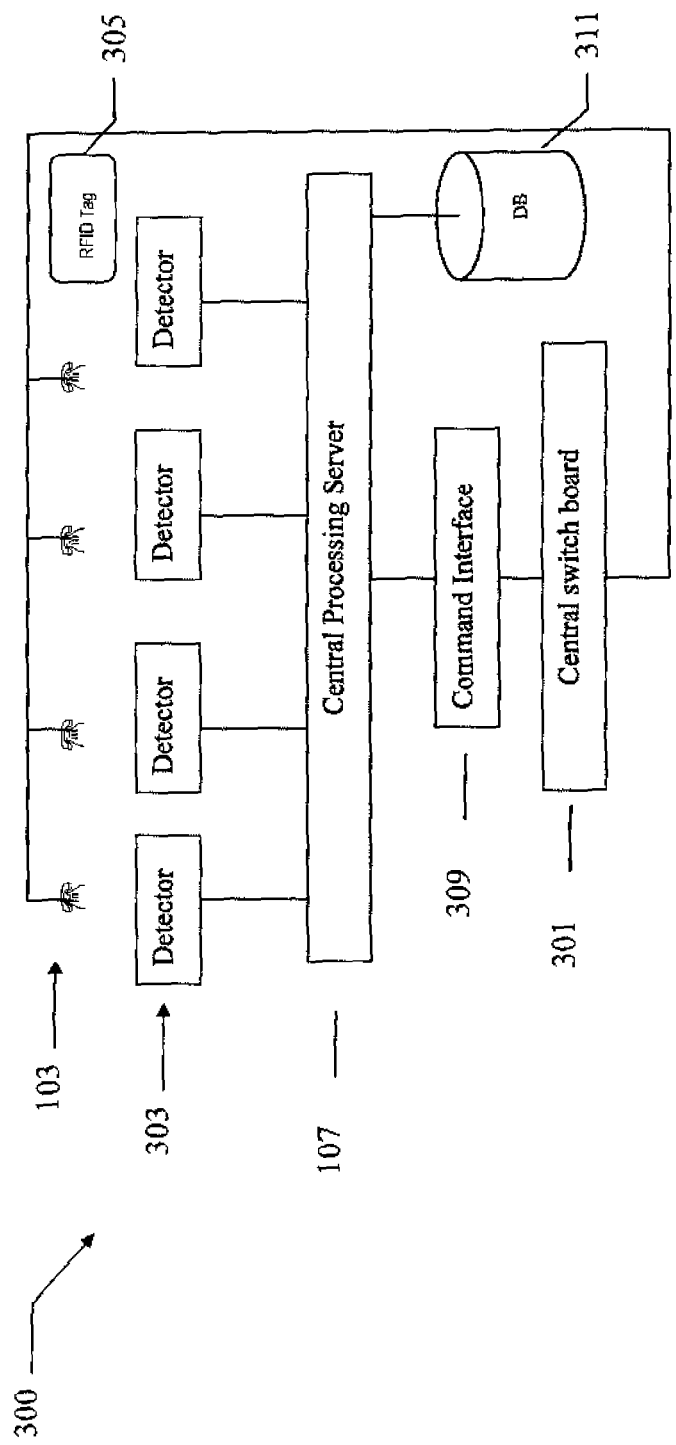
FIG. 3 depicts the main components that can be used for practicing the method.

Considering now FIG. 3, the main components that can be used to practice the method of a preferred embodiment of the invention are denoted as a whole with 300. The information (programs and data) is typically stored on the hard-disks of the different computers and loaded (at least partially) into the corresponding working memories when the programs are running. In an embodiment of the present invention, the plurality of telephone receivers 103 are distributed within the offices of one or more sites of an entity (e.g. a private Company or Corporation or a Public Body) all connected together by means of a switchboard system 301. A corresponding plurality of detectors 303 are positioned in proximity of the telephone receivers 103 (or at least to some of them), so that the presence of e.g. an RFID tag is detected whenever it comes within a predetermined distance. RFID (Radio Frequency Identification) is normally used as a sort of "bar code" that operate at a distance. It is a method of storing and retrieving data without the need of proximity of a reader. RFID tags are very small and can be easily incorporated in a card (in our case e.g. a Company badge) and carried by a user. They contain an antenna to receive and respond to an RFID transceiver. They can be passive or active. The advantage of the passive RFID is that they don't need power (i.e. a battery) and can therefore be smaller than active ones. For the purpose of the present invention a passive RFID tag is believed to be the best choice. Other technical solution could be used instead, even if at the moment the RFID technology seems to be the most convenient, effective and economically advantageous for a similar solution.

Such presence of the RFID tag 305 (and consequently the presence of the person carrying the tag to whom a telephone number or extension XY is assigned) next to a target telephone receiver 103 will then be communicated to a Central Processing Server 307. The Central Processing Server 307 will cause the Central Switch Board 301 to switch any incoming call, addressed to the number XY, to said target telephone receiver. An RFID tag can be assigned to each telephone number, so that the incoming calls addressed to a number XY will be redirected to the telephone receiver next to the corresponding RFID tag (and supposedly to the assignee of the tag and the number XY). An additional optional component of the system is a Command Interface 309 which allows the interaction with the Central Processing Server 307 and the Central Switch Board 301. It may be used for the central administration of the functions described above. This command interface can be implemented through simple command line interface (CLI), dialog panels simple or graphical (GUI), WEB based page or just a set of switches and a simple led display. Many different implementations of such interface are possible, the above system does not depend on how this interface is implemented and which technology it uses. As part of the administrative tasks accomplished by using this interface are the association between the phone numbers, the owners of that phone numbers and the unique corresponding RFID. This info is stored in a database 311 which can be also updated through the command interface. For ex. to add new users, or to delete existing ones (e.g. a retired employee) or to update the RFID code (e.g. a lost tag). Additional settings can be the ability to centrally enable or deny the possibility of using the RFID feature, to a single user or to a set or group of users; the creation of a "black list" (avoiding the function enabling in a conference room, or only enabling the switch for an instructor and not for the class attendees), or the definition of a specific set of RFIDs that can only switch between themselves The database 311 contains all the information necessary to create the association of a number and the current position of the corresponding RFID. The content of the DB 311 is modified according to the method as described below or can be modified by the system administrator as mentioned above. The database can be internal or external to the switch board system, can be local or remote (completely or partially), and its implementation is not relevant to the present embodiment. It can be a physical DB running on a PC, on a server, or it can be defined on a set of memory chips, or it can be defined on a EPROM, or mass storage devices (CD, DVD, TAPE, etc. . . . ). In the DB can also be stored info like the privileges and the operations allowed to each phone network user, the defaults used, any special class, the billing department, and so on.

Alternative implementations could be used in place of the structure described above, e.g. it is reasonable that an RFID detector 303 monitors the surrounding areas of a plurality of receivers 103 (e.g. all the telephones in a room). In such case it is reasonable to select one of the phones as the target receiver and possibly considering a back up in case the first receiver is busy. Another possible alternative is to embed the RFID detector in the telephone receiver.

Figure 4:
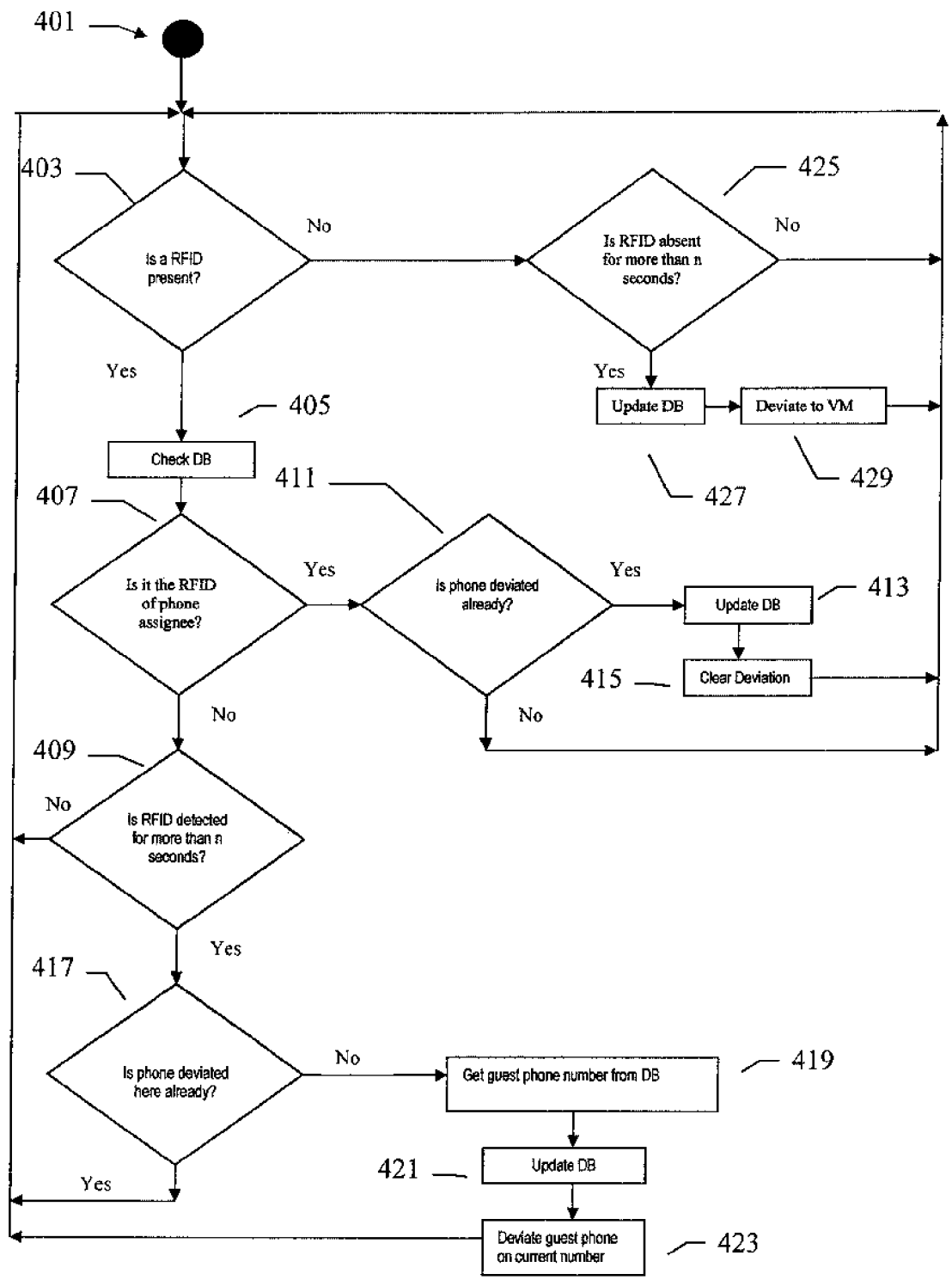
FIG. 4 show a diagram describing the flow of activities relating to an illustrative implementation of the method.

Considering now FIG. 4, the logic flow of a call forwarding method according to an embodiment of the invention is represented. In particular FIG. 4 is referred to a single detector/receiver set and describes the method of detecting the presence of a new temporary user next to the receiver and of communicating such temporary presence to the Central Processing Server 307 so that if and when an incoming call arrives, the call can be forwarded automatically to the phone receiver (or to one of the phone receivers) next to the user to whom the call is addressed. The method begins at the black start circle 401. Continuing to block 403 the system verify if the detectors has sensed the presence of an RFID tag within a predetermined distance from a receiver. Than (step 405) the database 311 is queried to see if the detected RFID tag corresponds to number assigned to that receiver (step 407). If the answer is yes, the system checks if the number is currently deviated to a different phone number (411), in which case the database 311 is updated (step 413) and the deviation is cleared (step 415). If the detected RFID tag results to be different from the telephone assignee, a test is done to verify if such presence can be considered a relatively permanent one, i.e. if the user carrying the tag remains near the phone (e.g. in the room) more than a predetermined period of time (step 409), in such case the database is updated and the number of the detected RFID tag is deviated to this telephone receiver (419, 421 and 423) unless it is determined that the number was deviated already to the same phone (step 417). Going back to the test 403, as a possible additional feature, if no RFID is detected and this absence lasts for more than a predetermined period of time (425) it is assumed that the user is away from his phone and the database is updated accordingly (427), so that, when a calls arrives can be automatically transferred to an answering machine or to a switchboard or a secretary, unless, of course the presence of a corresponding tag is detected somewhere else, in which case the call is forwarded accordingly. It is clear to those skilled in the art that the present method and step sequence is just one example of the many possible implementations. E.g., as mentioned above a different system for communicating and detecting the presence of a user could be used instead of the RFID techniques. Another possible equivalent solution would be to look for the position of the RFID tag corresponding to a specific number only when a call addressed to such specific number cannot be sent to the assigned telephone receiver because the absence of the user has been reported.

Similar considerations apply if the programs and data are structured in a different manner, if other modules or functions are provided, or if the information is stored in equivalent memory structures.

Similar considerations apply if the method includes equivalent or additional steps.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A computer implemented method of managing telecommunication transactions, comprising:
   operating a telecommunication network including a plurality of telecommunication endpoints connected to at least one common server, each telecommunication endpoint being assigned to at least one of a plurality of telecommunication subscribers, each telecommunication subscriber being associated with a portable detectable identifier;
   detecting the position of the portable detectable identifier associated with a first telecommunication subscriber;
   selecting a telecommunication endpoint from the plurality of telecommunication endpoints according to the position of the portable detectable identifier;
   forwarding an incoming communication request addressed to the first telecommunication subscriber to the selected telecommunication endpoint; and
   providing an administration interface including a feature to allow a user to configure a set of telecommunication subscribers from the plurality of telecommunication subscribers such that the forwarding the incoming communication request addressed to a telecommunication subscriber in the set can only forward to a telecommunication endpoint associated with another telecommunication subscriber in the set.

2. The computer implemented method of claim 1, wherein the administration interface further comprises:
   a second feature to disable the forwarding for a particular telecommunication endpoint such that the incoming communication request cannot be forwarded to the particular telecommunication endpoint even when the particular telecommunication endpoint can be selected according to the position of the portable detectable identifier, thereby black listing the particular telecommunication endpoint.

3. The computer implemented method of claim 1, wherein the administration interface further comprises:
   a third feature to disable the forwarding for a second set of telecommunication subscribers such that the incoming communication request for a second telecommunication subscriber in the second set can only be received at the telecommunication endpoint assigned to the second telecommunication subscriber.

4. The computer implemented method of claim 1, wherein the administration interface further comprises:
   a fourth feature to disable the detecting, the selecting, and the forwarding for the portable detectable identifier.

5. The computer implemented method of claim 1, wherein the detecting and the selecting occur before the incoming communication request is available, further comprising:
   updating a switchboard with the position responsive to the detecting, wherein the selecting associates the telecommunication endpoint with the first telecommunication subscriber for when the incoming communication request comes in at a later time.

6. The computer implemented method of claim 1, wherein the portable detectable identifier is a RFID tag, and wherein the plurality of telecommunication endpoints are distributed across a plurality of geographical locations, telecommunication endpoints in different geographic locations using different sub-networks to communicate with the telecommunication network.

7. A computer usable non-transitory storage medium comprising a computer usable program product including computer usable code for managing telecommunication transactions, the computer usable code comprising:
   computer usable code for operating a telecommunication network including a plurality of telecommunication endpoints connected to at least one common server, each telecommunication endpoint being assigned to at least one of a plurality of telecommunication subscribers, each telecommunication subscriber being associated with a portable detectable identifier;
   computer usable code for detecting the position of the portable detectable identifier associated with a first telecommunication subscriber;
   computer usable code for selecting a telecommunication endpoint from the plurality of telecommunication endpoints according to the position of the portable detectable identifier;
   computer usable code for forwarding an incoming communication request addressed to the first telecommunication subscriber to the selected telecommunication endpoint; and
   computer usable code for providing an administration interface including computer usable code for a feature to allow a user to configure a set of telecommunication subscribers from the plurality of telecommunication subscribers such that the forwarding the incoming communication request addressed to a telecommunication subscriber in the set can only forward to a telecommunication endpoint associated with another telecommunication subscriber in the set.

8. The computer usable program product of claim 7, wherein the computer usable code for administration interface further comprises:
   computer usable code for a second feature to disable the forwarding for a particular telecommunication endpoint such that the incoming communication request cannot be forwarded to the particular telecommunication endpoint even when the particular telecommunication endpoint can be selected according to the position of the portable detectable identifier, thereby black listing the particular telecommunication endpoint.

9. The computer usable program product of claim 7, wherein the computer usable code for administration interface further comprises:
   computer usable code for a third feature to disable the forwarding for a second set of telecommunication subscribers such that the incoming communication request for a second telecommunication subscriber in the second set can only be received at the telecommunication endpoint assigned to the second telecommunication subscriber.

10. The computer usable program product of claim 7, wherein the computer usable code for administration interface further comprises:
   computer usable code for a fourth feature to disable the detecting, the selecting, and the forwarding for the portable detectable identifier.

11. The computer usable program product of claim 7, wherein the detecting and the selecting occur before the incoming communication request is available, further comprising:
   computer usable code for updating a switchboard with the position responsive to the detecting, wherein the selecting associates the telecommunication endpoint with the first telecommunication subscriber for when the incoming communication request comes in at a later time.

12. The computer usable program product of claim 7, wherein the portable detectable identifier is a RFID tag, and wherein the plurality of telecommunication endpoints are distributed across a plurality of geographical locations, telecommunication endpoints in different geographic locations using different sub-networks to communicate with the telecommunication network.

13. A data processing system for managing telecommunication transactions, the data processing system comprising:
   a storage device including a storage medium, wherein the storage device stores computer usable program code; and
   a processor, wherein the processor executes the computer usable program code, and wherein the computer usable program code comprises:
   computer usable code for operating a telecommunication network including a plurality of telecommunication endpoints connected to at least one common server, each telecommunication endpoint being assigned to at least one of a plurality of telecommunication subscribers, each telecommunication subscriber being associated with a portable detectable identifier;
   computer usable code for detecting the position of the portable detectable identifier associated with a first telecommunication subscriber;
   computer usable code for selecting a telecommunication endpoint from the plurality of telecommunication endpoints according to the position of the portable detectable identifier;
   computer usable code for forwarding an incoming communication request addressed to the first telecommunication subscriber to the selected telecommunication endpoint; and
   computer usable code for providing an administration interface including computer usable code for a feature to allow a user to configure a set of telecommunication subscribers from the plurality of telecommunication subscribers such that the forwarding the incoming communication request addressed to a telecommunication subscriber in the set can only forward to a telecommunication endpoint associated with another telecommunication subscriber in the set.

14. The data processing system of claim 13, wherein the computer usable code for administration interface further comprises:
   computer usable code for a second feature to disable the forwarding for a particular telecommunication endpoint such that the incoming communication request cannot be forwarded to the particular telecommunication endpoint even when the particular telecommunication endpoint can be selected according to the position of the portable detectable identifier, thereby black listing the particular telecommunication endpoint.

15. The data processing system of claim 13, wherein the computer usable code for administration interface further comprises:
   computer usable code for a third feature to disable the forwarding for a second set of telecommunication subscribers such that the incoming communication request for a second telecommunication subscriber in the second set can only be received at the telecommunication endpoint assigned to the second telecommunication subscriber.

16. The data processing system of claim 13, wherein the computer usable code for administration interface further comprises:
   computer usable code for a fourth feature to disable the detecting, the selecting, and the forwarding for the portable detectable identifier.

17. The data processing system of claim 13, wherein the detecting and the selecting occur before the incoming communication request is available, further comprising:
   computer usable code for updating a switchboard with the position responsive to the detecting, wherein the selecting associates the telecommunication endpoint with the first telecommunication subscriber for when the incoming communication request comes in at a later time.

18. The data processing system of claim 13, wherein the portable detectable identifier is a RFID tag, and wherein the plurality of telecommunication endpoints are distributed across a plurality of geographical locations, telecommunication endpoints in different geographic locations using different sub-networks to communicate with the telecommunication network.

* * * * *